Nov. 16, 1965 V. J. POWERS 3,218,619

SELF-ALIGNING MAGNETIC TRANSDUCER HEAD ASSEMBLY

Filed July 3, 1962 2 Sheets-Sheet 1

INVENTOR.
VINCENT J. POWERS
BY
Bower & Patalidis
ATTORNEYS

SELF-ALIGNING MAGNETIC TRANSDUCER HEAD ASSEMBLY

Filed July 3, 1962 2 Sheets-Sheet 2

INVENTOR.
VINCENT J. POWERS
BY
Bower & Patalidis
ATTORNEYS 3,218,619

SELF-ALIGNING MAGNETIC TRANSDUCER HEAD ASSEMBLY

Vincent J. Powers, South Orange, N.J., assignor to Accurate Bushing Company, Garwood, N.J.
Filed July 3, 1962, Ser. No. 207,204
7 Claims. (Cl. 340—174.1)

The present invention relates in general to new and improved means of mounting magnetic transducer heads in close proximity to a magnetizable recording surface, and more particularly to self-aligning magnetic transducer heads adapted to be air or gas supported by the laminar flow of fluid clinging to the surface of a rapidly moving recording surface.

In the art of recording and reproducing data or information by means of magnetic transducer heads mounted in close proximity to a moving magnetic recording surface it is essential to maintain a spacing between the magnetic flux emitting pole pieces of the transducer head and the recording surface which is accurate, uniform and as narrow as possible, while preventing actual contact therebetween in order to minimize damage to both the transducer head and the recording surface.

This spacing or air gap must be narrow in order to permit high density recording without cross-talk between adjacent tracks, and in order to provide strong playback characteristics. The air gap must be constant because of the requirement of constant recording and playback levels. Any run-out, wobble or vibration of the moving recording surface destroys any attempt at recording high density magnetic data bits where transducer heads are fixedly mounted in such a way that they are prevented from following the irregularities of the recording surface.

It is well known that a rapidly moving recording surface of the type commonly used in random access magnetic data recording devices, such as magnetic drums and discs, generates a laminar flow of the layer of air or gas clinging to the recording surface and set in motion by frictional interaction. The rapidly moving layer of fluid creates a hydrodynamic effect exerting a lifting force that enables a transducer head mounted on an appropriate support member and subjected to a biasing force in the direction of the recording surface to "fly" or float at a predetermined distance from the recording surface. The air gap thus created depends from the intensity of the biasing force, the area and shape of the support member, and the velocity of the laminar film of fluid. By varying these factors an equilibrium condition is easily obtainable and controllable.

The present invention contemplates mounting a transducer head in a bearing member which is thus adapted to fly at a predetermined distance from a rapidly moving recording surface. The bearing member is resiliently supported by means of a leaf spring which, by auxiliary means forming no part of the present invention, is caused to bias the bearing member toward the recording surface as soon as the latter has reached a predetermined velocity which is necessary to create a laminar fluid flow. The bearing member is self-aligning in order to dispense with means adjusting the parallelism between the bearing member surface and the recording surface and for enabling the bearing member to follow any irregularity, runout, wobble, etc., of the recording surface.

It is therefore an object of the present invention to provide an improved device for positioning a magnetic transducer close to, but out of contact from, a rapidly moving recording surface.

It is a further object of the present invention to provide an improved device for positioning a magnetic transducer close to a moving recording surface by utilizing the fluid flow created by the motion of the recording surface.

It is another object of the invention to provide a magnetic transducer bearing member which is self-adjusting and self-aligning and capable of following any irregularity of the recording surface.

It is an additional object of the invention to provide a magnetic transducer bearing member which is independently and universally mounted by means of a spherical self-aligning joint assembly.

Other objects and advantages of the invention will be pointed out in the following description and claims, and in the accompanying drawings which illustrate, by way of examples, the principle of the invention and the best modes which have been contemplated of applying that principle.

Figure 3:
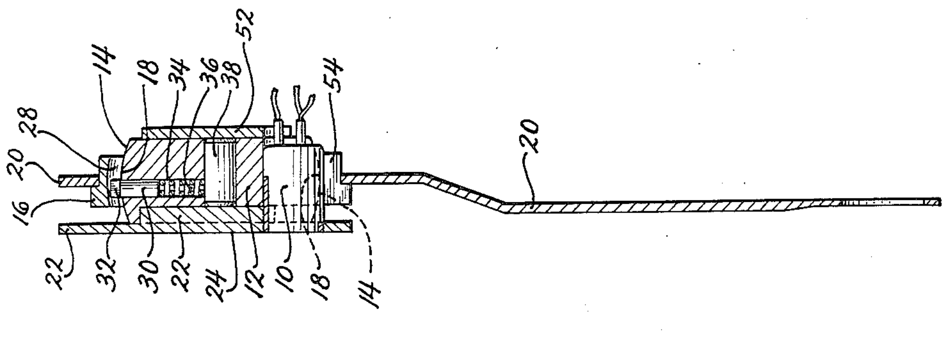
FIGURE 3 is a partial cross-sectional view taken along line 3—3 of FIGURE 2.
Figure 2:
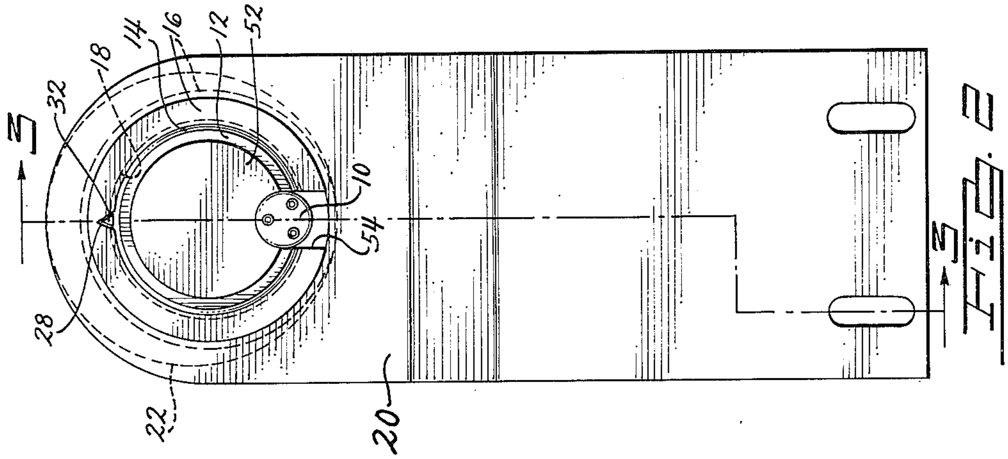
FIGURE 2 is a top plan view of the embodiment illustrated in FIGURE 1.
Figure 1:
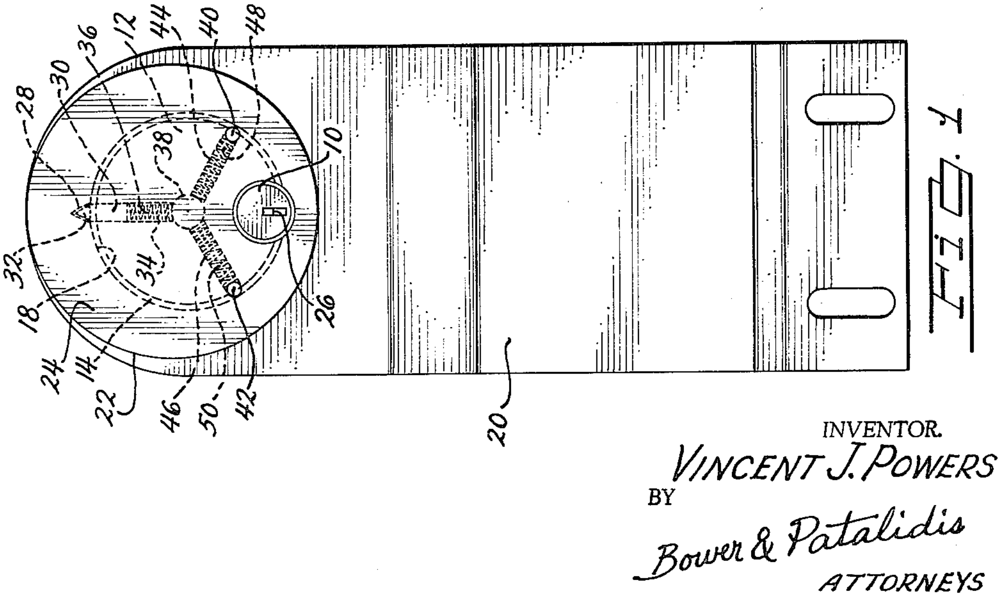
FIGURE 1 is a bottom plan view of one embodiment of the present invention.

Referring now to the drawings and more particularly to FIGURES 1–3 thereof, a magnetic transducer assembly according to the invention comprises a transducer head 10 cemented, bonded or otherwise fastened to a disc-shaped support member 12 having a convex spherical surface 14 on the periphery thereof. An annular socket member 16, presenting an inner concave spherical surface 18 conforming to the convex spherical surface 14 of the support member 12, is disposed around the support member and is soldered, cemented or otherwise fastened to one end of a resilient flat spring 20 having its other end adapted to be fastened to a rigid stationary support member (not shown). A gliding pad or bearing member 22, integral with or fastened to one side of the support member 12, presents a bearing surface 24 which may be disc-shaped in plan view, as shown in the drawings by way of example, or which may be of any other appropriate shape. The flux emitting core gap 26 of the transducer head is preferably disposed flush with the bearing surface 24. The bearing surface 24 may advantageously be coated with an unctuous material comprising, for example, ceramics and polytetrafluorothylene among its constitutive ingredients, and which presents the advantage of preventing damage to the recording surface in the event of accidential contact therewith.

A groove 28 is disposed in the annular socket member 16, substantially parallel to the axis thereof. A plunger member 30, presenting a pointed tapered end 32 adapted to engage the groove 28, is disposed in a radial bore 34 in the support member 12. A coil spring 36 normally urges the plunger member 30 in such a way as to cause its tapered end 32 to engage the groove 28 and thereby lock the support member 12 in a predetermined longitudinally aligned position in relation to the socket member 16, while still permitting the support member to be orientable in all other directions in relation to and within the socket member.

Friction drag members 40 and 42, which may advantageously be ball shaped as shown in the drawings, are disposed in radial bores 44 and 46 in the support member 12 and are urged by coil springs 48 and 50, respectively, to bear against the concave spherical surface 18 of the annular socket member 16. A stud member 38 maintains the coil springs 36, 48 and 50 in place in their respective bores, and a cover member 52 may be used to complete the assembly. Cut-out portion 54 in the annular socket member 16 permits assembly of the support member 12 within the annular socket member by placing the support member and the annular socket member in planes at a 90° angle, introducing the support member through the cut-out portion 54 into the socket member and rotating the support member 90° until it lies substantially in a same plane as the annular socket member.

The transducer head assembly of the invention is normally mounted by being clamped at the free end of the flat spring member 20 in a mounting member (not shown) in such a way as to cause the bearing surface 24 of the gliding pad 22 to be approximately parallel to the recording surface (not shown) on which information is to be recorded and from which information is to be read. The bearing surface 24 is normally a certain distance away from the recording surface when the latter is at rest. When the recording surface is in motion, a laminar film of gas fluid clinging to the record surface is caused to move at approximately the same velocity as the velocity of translation of the recording surface. The spring member 22 is then bent by a mechanism, which forms no part of the present invention, in the direction which tends to decrease the distance separating the bearing surface 24 from the record surface. The bearing surface 24 is thus forced to occupy a predetermined position away from the recording surface, being there supported by the fluid bearing developed by the motion of the laminar film of gas. The bearing surface 24 automatically aligns itself substantially parallel to the record surface, and due to the ball and socket connection between the support member 12 and the annular socket member 16, combined with the resilient action of the spring member 20, the bearing surface 24 and consequently the transducer head flux emitting gap 26 are capable of following all the irregularities, runouts or wobbles of the recording surface.

The action of the friction drag members 40 and 42 is only strong enough to restrict somewhat the free motions of the support member 12 in relation to the annular socket member 16 only for the purpose of maintaining the support member in approximate proper position when the recording surface is not moving, while being weak enough not to interfere with the required relative motions between the support member and the annular socket member during normal operation of the data recording device.

Figure 6:
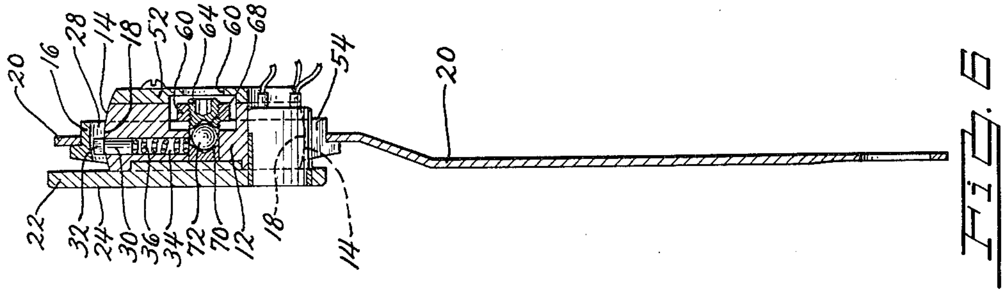
FIGURE 6 is a partial cross-sectional view taken along line 6—6 of FIGURE 5.
Figure 5:
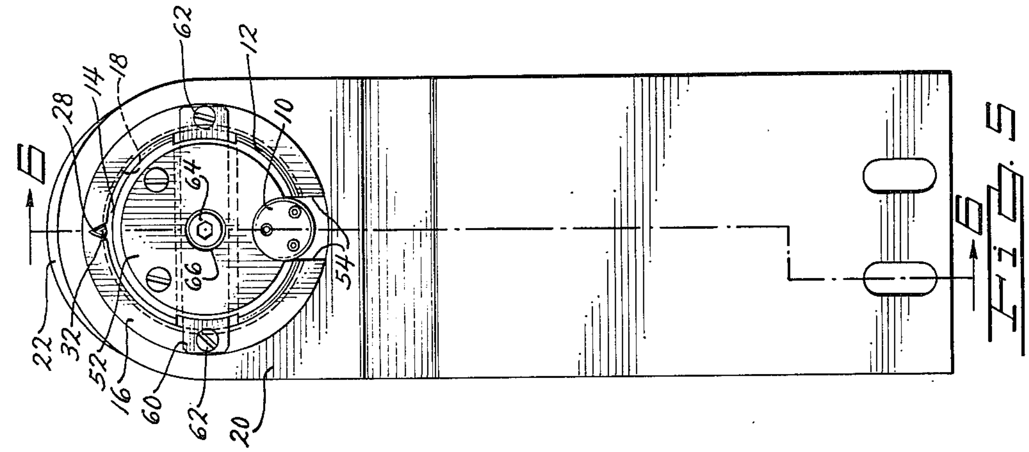
FIGURE 5 is a top plan view of the modification of FIGURE 4.
Figure 4:
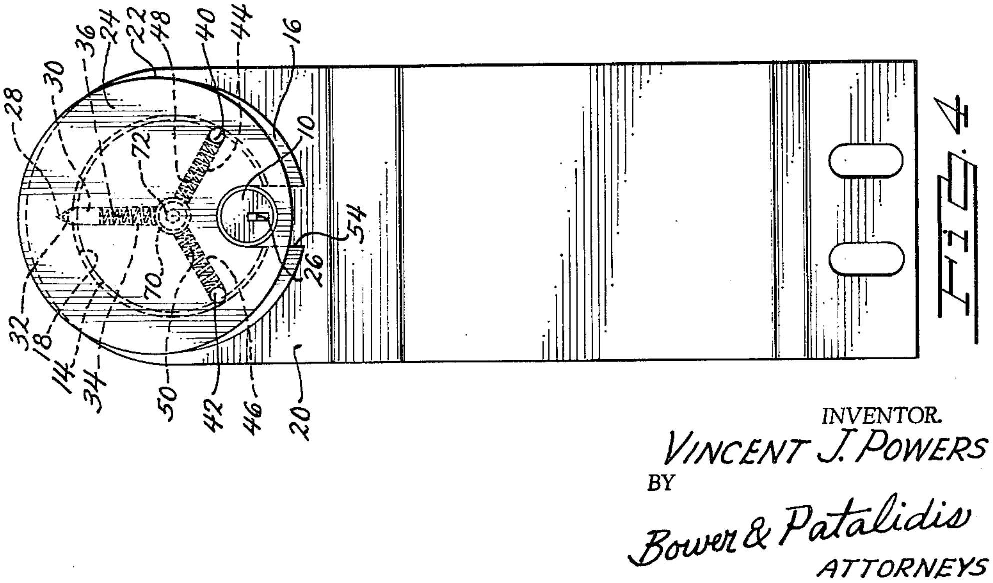
FIGURE 4 is a bottom plan view of a modification of the embodiment of FIGURES 1–3.

The modification represented by FIGURES 4–6 comports all the elements described in connection with the assembly of FIGURES 1–3, but further includes a bridge member 60 fastened to the annular socket members 16 by means of screws 62 or the like. A set screw 64, accessible through an access hole 66 disposed in the cover 52, is adjustably received by an appropriate threaded hole through the bridge member 60. The set screw 64 has a recessed end 68, and a substantially symmetrical recess 70 is disposed in the support member 12. A ball 72 is disposed in the cavity formed by the recessed end 68 and the recess 70.

In this fashion, the reaction of the fluid bearing exerted on the support member 12 through its bearing face 24 is transmitted to the annular socket member 16 essentially by way of the ball 72 instead of being transmitted through the spherical surfaces 14 and 16. This configuration presents the advantage that, in case of extreme load upon the bearing surface 24, there is no risk of causing a wedging action between the spherical surfaces which would in turn result in the support member 12 being partially frozen into the socket member 16.

It is to be noted that, in both examples of the invention, the transducer head 10 is preferably mounted on the support member 12 with its flux emitting gap 26 proximate the trailing edge of the bearing surface 24 and that the pivot center of the support member does not coincide with the geometric center of the bearing surface 24 but is preferably slightly rearward thereof. Such an arrangement affords better bearing or gliding characteristics by providing a bearing surface which is self-stabilizing at a very slight positive incidence or angle of attack in relation to the record surface. The transducer head, being positioned close to the trailing edge of the bearing surface, has consequently its magnetic gap at a point of substantially minimum distance between the bearing surface and the record surface, thus providing the optimum conditions for best recording and playback functions.

Although the bearing surface 24 has been represented as a flat surface and could actually be made as such, it has been found that a slightly convex surface, either cylindrical or spherical, has some advantages in obtaining better gliding characteristics for a transducer assembly coacting with a flat-surfaced record medium. A flat-surfaced or a slightly concave-surface bearing surface can be used to coact with a cylindrical record medium such as a magnetic drum.

While there has been shown and described and pointed out the fundamental novel features of the invention as applied to the preferred embodiments, it will be understood that various omissions and changes and substitutions in the form and details of the apparatus illustrated may be made by those skilled in the art without departing from the spirit and scope of the invention. Consequently, the invention herein disclosed is to be construed as limited only by the spirit and scope of the appended claims.

What is new is:

1. Apparatus for supporting a magnetic transducer head a predetermined distance away from a moving magnetizable surface by utilizing the bearing fluid set in motion by the movement of said magnetizable surface, said apparatus comprising:

said magnetic transducer head;

a support member for said transducer head, said support member having a bearing surface adapted to be supported by said bearing fluid;

a spherical convex surface on the periphery of said support member;

an annular socket member having an inner spherical concave surface adapted to engage the spherical convex surface on the periphery of the support member;

a thrust bearing element adapted to transmit the load from the mounting member to the socket member;

and a resilient flat spring member having one end fastened to said socket member and another end adapted to be fixedly supported.

2. The apparatus of claim 1 wherein the bearing surface is coated with an unctuous plastic material.

3. The apparatus of claim 1 wherein the bearing surface is disc shaped in plan view.

4. The apparatus of claim 1 wherein the magnetic transducer head is supported proximate the trailing edge of said bearing surface.

5. The apparatus of claim 1 further comprising:

friction elements interposed between the spherical convex and concave surface and pressing against the concave surface, urged thereagainst by coil springs radially disposed in said support member.

6. The apparatus of claim 5 further comprising:

an aligning member consisting of a plunger with a pointed tapered end adapted to engage a groove in the concave surface substantially normal to the bearing surface of the support member and being urged in position by the biasing action of a coil spring radially disposed in said support member.

7. The apparatus of claim 1 wherein the thrust bearing element comprises:

a bridge member affixed to the annular socket member substantially along a diameter thereof;

a set screw in said bridge member having an axis substantially along the axis of the annular socket member and an end presenting a recess;

a recess in the support member corresponding to the recess in the end of said set screw;

and a ball disposed in said recesses for supporting the load on said support member.

References Cited by the Examiner

UNITED STATES PATENTS

| | | | |
|---|---|---|---|
| 2,088,237 | 7/1937 | Gaus et al. | 248—180 |
| 2,862,781 | 12/1958 | Baumeister | 340—174.1 |
| 2,863,002 | 12/1958 | Maclay | 179—100.2 |
| 2,957,051 | 10/1960 | Epstein et al. | 340—174.1 |
| 2,986,607 | 5/1961 | Jacobs et al. | 179—184 |

FOREIGN PATENTS

| | | |
|---|---|---|
| 503,898 | 4/1939 | Great Britain. |

IRVING L. SRAGOW, *Primary Examiner.*